United States Patent

Hackmann et al.

[11] Patent Number: 6,084,099
[45] Date of Patent: Jul. 4, 2000

[54] PREPARATION OF N,N'-DIALKYLPERYLENE-3,4,9,10-TETRACARBOXYLIC ACID DIIMIDES

[75] Inventors: Claus Hackmann, Ludwigshafen; Michael Acker, Heidelberg; Georg Henning, Ludwigshafen; Siegfried Mensch, Maxdorf, all of Germany

[73] Assignee: BASF Aktiengesellschaft, Ludwigshafen, Germany

[21] Appl. No.: 09/147,202

[22] PCT Filed: Jul. 29, 1997

[86] PCT No.: PCT/EP97/04101

§ 371 Date: Oct. 28, 1998

§ 102(e) Date: Oct. 28, 1998

[87] PCT Pub. No.: WO98/06786

PCT Pub. Date: Feb. 19, 1998

[30] Foreign Application Priority Data

Aug. 9, 1996 [DE] Germany .......................... 196 32 204

[51] Int. Cl.$^7$ .................................................. C07D 471/02
[52] U.S. Cl. .................................. 546/37; 546/36
[58] Field of Search .......................... 546/36, 37

[56] References Cited

U.S. PATENT DOCUMENTS

| | | | |
|---|---|---|---|
| 4,585,878 | 4/1986 | Jost et al. | 548/453 |
| 5,017,713 | 5/1991 | Kondo et al. | 552/237 |

FOREIGN PATENT DOCUMENTS

| | | |
|---|---|---|
| 1 433 688 | 2/1966 | France . |
| 2.027.743 | 1/1970 | France . |
| 2 394 581 | 6/1978 | France . |
| 276 357 | 6/1913 | Germany . |
| 276 956 | 6/1928 | Germany . |
| 1 272 270 | 2/1961 | Germany . |
| 21 53 087 | 10/1971 | Germany . |
| 27 27 484 | 1/1979 | Germany . |
| 48-001409 | 1/1973 | Japan . |
| WO 96/08537 | 3/1996 | WIPO . |

*Primary Examiner*—Shailendra Kumar
*Attorney, Agent, or Firm*—Oblon, Spivak, McClelland, Maier & Neustadt, P.C.

[57] ABSTRACT

Preparation of N,N'-di($C_1$–$C_4$ alkyl)perylene-3,4,9,10-tetracarboxylic acid diimides (I) by the reaction of perylene-3,4,9,10-tetracarboxylic acid diimide (II) with a $C_1$–$C_4$ alkyl halide, in which the reaction is carried out in a dipolar-aprotic organic solvent in the presence of an inorganic base.

8 Claims, No Drawings

PREPARATION OF N,N'-DIALKYLPERYLENE-3,4,9,10-TETRACARBOXYLIC ACID DIIMIDES

This application is a 371 of PCT/EP97/04101, filed Jul. 29, 1997.

The present invention relates to a novel process for the preparation of N,N'-di($C_1$–$C_4$) alkylperylene-3,4,9,10-tetracarboxylic acid diimides (I) by the reaction of perylene-3,4,9,10-tetracarboxylic acid diimide (II) with a $C_1$–$C_4$ alkyl halide.

N,N'-di($C_1$–$C_4$)alkylperylene-3,4,9,10-tetracarboxylic acid diimides (I q; referred to below as "dialkyl perylimides"), and primarily dimethyl perylimide (Ia q; C.I. Pigment Red 179), represent important pigments for dyeing varnishes, in particular motor vehicle enamels and plastics materials.

Various processes for the preparation of dimethyl perylimide (Ia) are known, these being summarized in DE-A 2,727,484. Thus the preparation of (Ia) can take place by the reaction of perylene-3,4,9,10-tetracarboxylic acid diimide (II; referred to below as "perylimide") with methyl chloride in sodium hydroxide solution under pressure (DE-A 1,272,270), by alkali metal hydroxide fusion of N-methylnaphthalenecarboxylic acid imide (DE-PS 276,357), or by the reaction of perylene-3,4,9,10-tetracarboxylic acid dianhydride with aqueous methylamine under pressure (DE-A 2,153,087). Only in the last-named reaction, which is elaborate, since the dianhydride must first of all be prepared by saponification of perylimide (II), pigments can be obtained in tints ranging from pure red to yellowish red, whilst the first-named reactions give pigments in chestnut tints, which are subjected to elaborate purification steps such as vatting, alkaline extraction of the leuco-compound, and reoxidation (DE-A 2,727,484) to obtain pure red tints.

Furthermore WO-A 96/08537 describes a process for the N-methylation of organic pigments by reaction with dimethyl carbonate in the presence of triethylamine and a polar organic solvent such as dimethyl acetamide. In this reaction, which takes up to 100 h, however, only mixtures of products having different degrees of methylation are obtained, and these must be separated. Thus dimethyl perylimide (Ia) is also obtained only in the form of a chestnut-colored product having a purity of 62%.

It is thus an object of the invention to make dialkyl perylimides (I) economically available in high purity and good yields.

Accordingly, we have found a process for the preparation of N,N'-di($C_1$–$C_4$)alkylperylene-3,4,9,10-tetracarboxylic acid diimides (I) by the reaction of perylene-3,4,9,10-tetracarboxylic acid diimide (II) with a $C_1$–$C_4$ alkyl halide, wherein the reaction is carried out in a dipolar-aprotic organic solvent in the presence of an inorganic base.

Suitable dipolar-aprotic solvents for this purpose are, in addition to sulfoxides and sulfolanes, primarily carboxamides, in particular aliphatic carboxamides (preferably N,N-di($C_1$–$C_4$ alkyl)$C_1$–$C_2$ carboxamides), lactams and cyclic and acyclic urea derivatives, and mixtures thereof. These solvents are preferably used in dried form.

The following are specific examples thereof: dimethyl sulfoxide, sulfolane, dimethyl formamide, diethyl formamide, dibutyl formamide, dimethyl acetamide, diethyl acetamide, dibutyl acetamide, N-formylmorpholine, N-methylpyrrolidone, 1,3'-dimethylimidazolidin-2-one, 1,3'-dimethyltetrahydropyrimidin-2-one, and tetramethyl urea.

For the purposes of the invention, dimethyl formamide and, in particular, dimethyl acetamide are preferred.

The amount of solvent is not critical and is usually from 10 to 200 moles, preferably from 40 to 60 moles per mole of perylimide (II).

Suitable inorganic bases are primarily the alkali metal salts (lithium and preferably sodium and potassium salts) of weak inorganic acids such as carbonic acid and phosphoric acid, and also mixtures of these salts.

The following can be cited as being particularly suitable examples: sodium bicarbonate and potassium hydrogen carbonate and also trisodium phosphate and preferably sodium carbonate and potassium carbonate.

There are normally used, per mole of perylimide (II), from 2 to 10 mol and preferably from 2 to 5 mol of inorganic base.

Suitable alkylating agents are the alkyl iodides and also, in particular, the alkyl bromides and, more particularly, the alkyl chlorides, which have $C_1$–$C_4$ alkyl radicals.

The ethyl and methyl halides are of special significance, preferably ethyl chloride and more preferably methyl chloride.

From 1 to 20 mol and preferably from 4 to 10 mol of alkyl halide per mole of perylimide (II) are usually employed.

No surfactants are usually employed in the process of the invention. If, however, the reaction is to be carried out in the presence of these agents, then cationic surfactants are primarily suitable such as ammonium salts of the formula $R_4N^+X^-$, in which the radicals R denote the same or different alkyl groups (usually $C_1$–$C_{16}$) and/or aryl groups (usually phenyl or benzyl) and the anions $X^-$ preferably stand for anions of inorganic acids, such as chloride, bromide, iodide, hydrogen sulfate, methyl sulfate, perchlorate and hydroxide, and also for anions of organic acids, such as benzoate, such as tri($C_1$–$C_4$ alkyl)phenyl-, tri($C_1$–$C_4$ alkyl)benzyl-, di($C_1$–$C_4$ alkyl)dibenzyl and $C_{10}$–$C_{16}$ alkyl-tri($C_1$–$C_4$ alkyl)ammonium salts;

pyridinium salts of the formula $R(C_5H_5N)^+X^-$, such as N-$C_{10}$–$C_{16}$ alkyl and N-phenyl($C_7$–$C_{10}$ alkyl) pyridinium salts;

phosphonium salts of the formula $R_4P^+X^-$.

The following can be cited as being preferred in the present process: the phosphonium and, in particular, the ammonium salts.

The following may be cited as specific examples: tetra-n-butylammonium chloride, bromide, iodide, hydrogen sulfate, and hydroxide, tetra-n-pentylammonium chloride and bromide, tetra-n-hexylammonium chloride, bromide, and hydrogen sulfate, trioctylpropylammonium chloride and bromide, tricaprylmethylammonium chloride, cetyltrimethylammonium chloride, bromide and methyl sulfate, lauryltrimethylammonium chloride, lauryltriethylammonium chloride, phenyltrimethylammonium chloride, phenyltriethylammonium chloride, benzyltrimethylammonium chloride, bromide, and hydroxide, benzyltriethylammonium chloride and bromide, benzyltributylammonium chloride and bromide, dibenzyldiethylammonium chloride, dibenzyldiethylammonium chloride, lauryldimethylbenzylammonium chloride, laurylpyridinium chloride, cetylpyridinium chloride, benzylpyridinium chloride, tetraphenylphosphonium chloride, benzyltriphenylphosphonium iodide, ethyltriphenylphosphonium bromide, tetra-n-butylphosphonium chloride, and tri-n-butylhexadecylphosphonium bromide.

If surfactants are used, their amounts are then usually from 10 to 50 g and preferably from 15 to 25 g per kilogram of perylimide (II).

The alkylation reaction of the invention is carried out generally at from 60° to 220° C. and preferably at from 140° to 180° C., and under autogenous pressure (usually from 2 to 20 bar; boiling of the solvent, liberation of $CO_2$).

The reaction times are usually from 4 to 12 h and in particular from 5 to 9 h.

From a process engineering aspect the process of the invention is advantageously carried out as follows: the inorganic base and the perylimide (II) are suspended in an autoclave in the solvent used, after purging with nitrogen the alkylating agent is added, which in the case of the preferred methyl and ethyl chlorides is advantageously effected by forcing in the gaseous material, and the mixture is heated to the temperature of reaction with stirring over a period of from approximately 0.5 to 2 h. After stirring over a period of approx. 5 to 10 hours at this temperature the reaction mixture is cooled and the autoclave is depressurized.

Purification of the reaction mixture to give the alkyl perylimides (I) can take place in the usual manner by isolation, by filtration, washing, first with solvent and then with water, followed by drying.

The process of the invention makes it possible to prepare the alkyl perylimides (I) in good yields and very high purity in a simple manner. The alkyl perylimides (I) obtained can be used for dyeing purposes without further purification immediately following usual pigment enhancement.

The process of the invention is of particular significance regarding the preparation of dimethyl perylimide (Ia), which is obtained as a red pigment having a purity of usually better than 95% and having a slight yellow cast, in the form of needles having a length of approximately 1 to 100 µm.

EXAMPLE

In a stirred autoclave 50 g of perylene-3,4,9,10-tetracarboxylic acid diimide (II; as 96% strength; calc. As 100%; obtained by alkali metal fusion of naphthalimide) were introduced into a mixture of 67.5 g of anhydrous potassium carbonate and 500 g of dimethyl acetamide with stirring. After purging with nitrogen there were forced in 42 g of methyl chloride. The reaction mixture was then heated over a period of 1 h to a temperature of 160° C. (increasing autogenous pressure from 4 to 12 bar), stirred at this temperature over a period of 6 h and then cooled.

Following pressure let-down the product was filtered off, washed first with dimethyl acetamide and then with water, and dried at 70° C.

There were obtained 52.5 g of N,N'-dimethylperylene-3,4,9,10-tetracarboxylic diimide (Ia) having a purity of 96% in the form of readily filterable needles having a length of from 1 to 100 µm, which is equivalent to a yield of 96%. Pigment enhancement (milling and recrystallization) gave a brilliant red pigment having a yellow cast.

We claim:

1. A process for the preparation of N,N'-di($C_1$–$C_4$ alkyl) perylene-3,4,9,10-tetracarboxylic acid diimides (I) by the reaction of perylene-3,4,9,10-tetracarboxylic acid diimide (II) with a $C_1$–$C_4$ alkyl halide, wherein the reaction is carried out in a dipolar-aprotic organic solvent in the presence of an inorganic base.

2. A process as defined in claim 1, wherein the dipolar-aprotic solvent is selected from the group consisting of a carboxamide, a lactam, a cyclic or acyclic urea derivative, a sulfoxide, and a sulfone, and a mixture thereof.

3. A process as defined in claim 1, wherein the dipolar-aprotic solvent is dimethyl formamide or dimethyl acetamide.

4. A process as defined in claim 1, wherein the inorganic base is an alkali metal salt of a weak inorganic acid.

5. A process as defined in claim 1, wherein the inorganic base is sodium or potassium carbonate.

6. A process as defined in claim 1, wherein the alkyl halide is an alkyl chloride.

7. A process as defined in claim 1, wherein the reaction is carried out at from 140° to 180° C. under autogenous pressure.

8. A process as defined in claim 1, which is used for the preparation of N,N'-dimethyl perylene-3,4,9,10-tetracarboxylic acid diimide (Ia).

* * * * *